United States Patent
Wang et al.

(10) Patent No.: US 9,434,480 B2
(45) Date of Patent: Sep. 6, 2016

(54) DISPLAY SYSTEMS AND METHODS FOR GENERATING A DISPLAY PROVIDING RUNWAY ILLUSION ALLEVIATION

(71) Applicant: HONEYWELL INTERNATIONAL INC., Morristown, NJ (US)

(72) Inventors: Guo Qing Wang, Beijing (CN); Gang He, Morristown, NJ (US); Wen Fan Guo, Beijing (CN); Hai DongHuang, Beijing (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 8 days.

(21) Appl. No.: 14/595,641

(22) Filed: Jan. 13, 2015

(65) Prior Publication Data

US 2016/0200451 A1 Jul. 14, 2016

(51) Int. Cl.
*G08G 5/00* (2006.01)
*G01S 1/00* (2006.01)
*B64D 45/04* (2006.01)

(52) U.S. Cl.
CPC .................... *B64D 45/04* (2013.01)

(58) Field of Classification Search
CPC combination set(s) only.
See application file for complete search history.

(56) References Cited

U.S. PATENT DOCUMENTS

| 4,210,930 | A | | 7/1980 | Henry | |
|---|---|---|---|---|---|
| 7,352,292 | B2 | * | 4/2008 | Alter | G01C 23/00 340/945 |
| 8,917,191 | B1 | * | 12/2014 | Tiana | G01C 23/00 340/945 |
| 9,177,204 | B1 | * | 11/2015 | Tiana | G06K 9/0063 |
| 2012/0035789 | A1 | | 2/2012 | He | |
| 2013/0218374 | A1 | * | 8/2013 | Lacko | G08G 5/025 701/16 |
| 2013/0300587 | A1 | * | 11/2013 | Wyatt | G01C 23/00 340/972 |

FOREIGN PATENT DOCUMENTS

| EP | 1840861 A2 | 10/2007 |
|---|---|---|
| EP | 1944580 A1 | 7/2008 |
| EP | 2148175 A1 | 1/2010 |
| EP | 2664895 A2 | 11/2013 |

OTHER PUBLICATIONS

AIRBUS; Flight Operations Briefing Notes; Human Performance, Visual Illusions Awareness; FOBN Reference : FLT_OPS—HUM_PER—SEQ 11—REV 02—Sep. 2005.

(Continued)

*Primary Examiner* — Yonel Beaulieu
(74) *Attorney, Agent, or Firm* — Lorenz & Kopf, LLP

(57) ABSTRACT

Display systems and methods for generating a display providing runway illusion alleviation are disclosed herein. An exemplary method for generating a display includes the steps of determining a position of the aircraft in a vicinity of an approaching runway, retrieving terrain data regarding the vicinity of the approaching runway and retrieving runway data regarding the approaching runway, determining the existence of a runway illusion effect by analyzing the terrain data and the runway data. The method further includes the steps of rendering graphical terrain imagery and rendering graphical runway imagery on the flight display in accordance with the terrain data and the runway data and rendering a graphical runway illusion alleviation object on the flight display.

10 Claims, 13 Drawing Sheets

(56) References Cited

OTHER PUBLICATIONS

Reynolds, NB; An Investigation into Landing Approach Visual Illusions A thesis submitted in partial fulfillment of the requirements for the Degree of Master of Social Sciences in Psychology at the University of Waikato, 2007.

EP Extended Search Report for Application 16150359-4 - 1803 dated Jun. 6, 2016.

N.A., "Tool Kit Flight Safety Foundation Approach-and Landing Accident Reduction", Flight Safety Digest, Nov. 2000, retrieved from the Internet: URL:http://flightsafety.org/files/alar_bn5-3-illusions.pdf [retrieved on May 26, 2016].

* cited by examiner

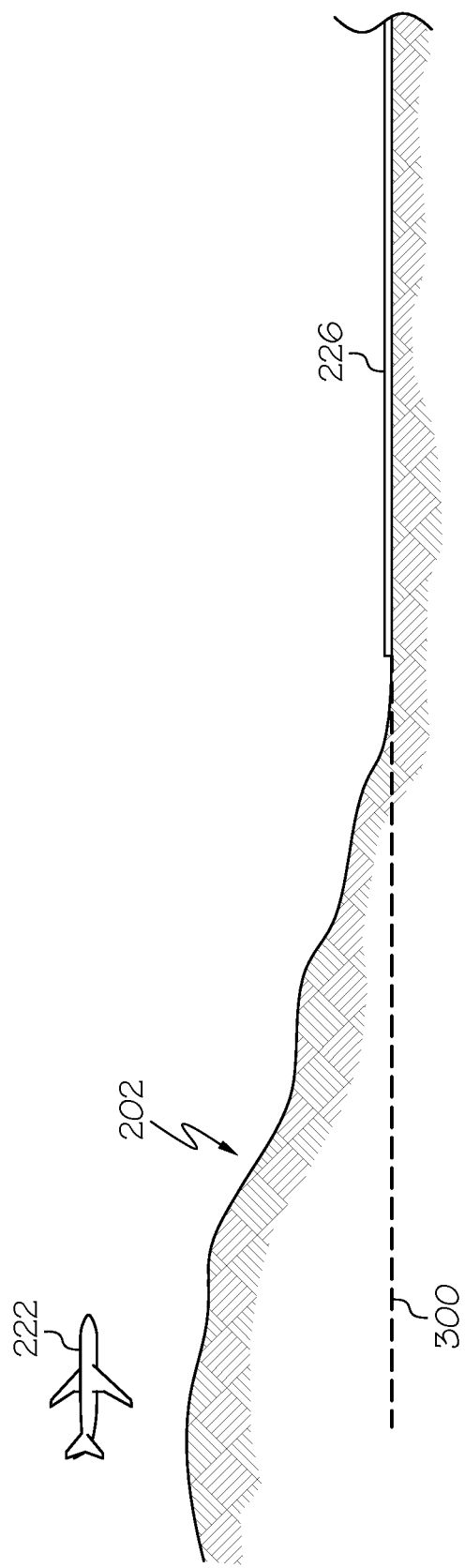

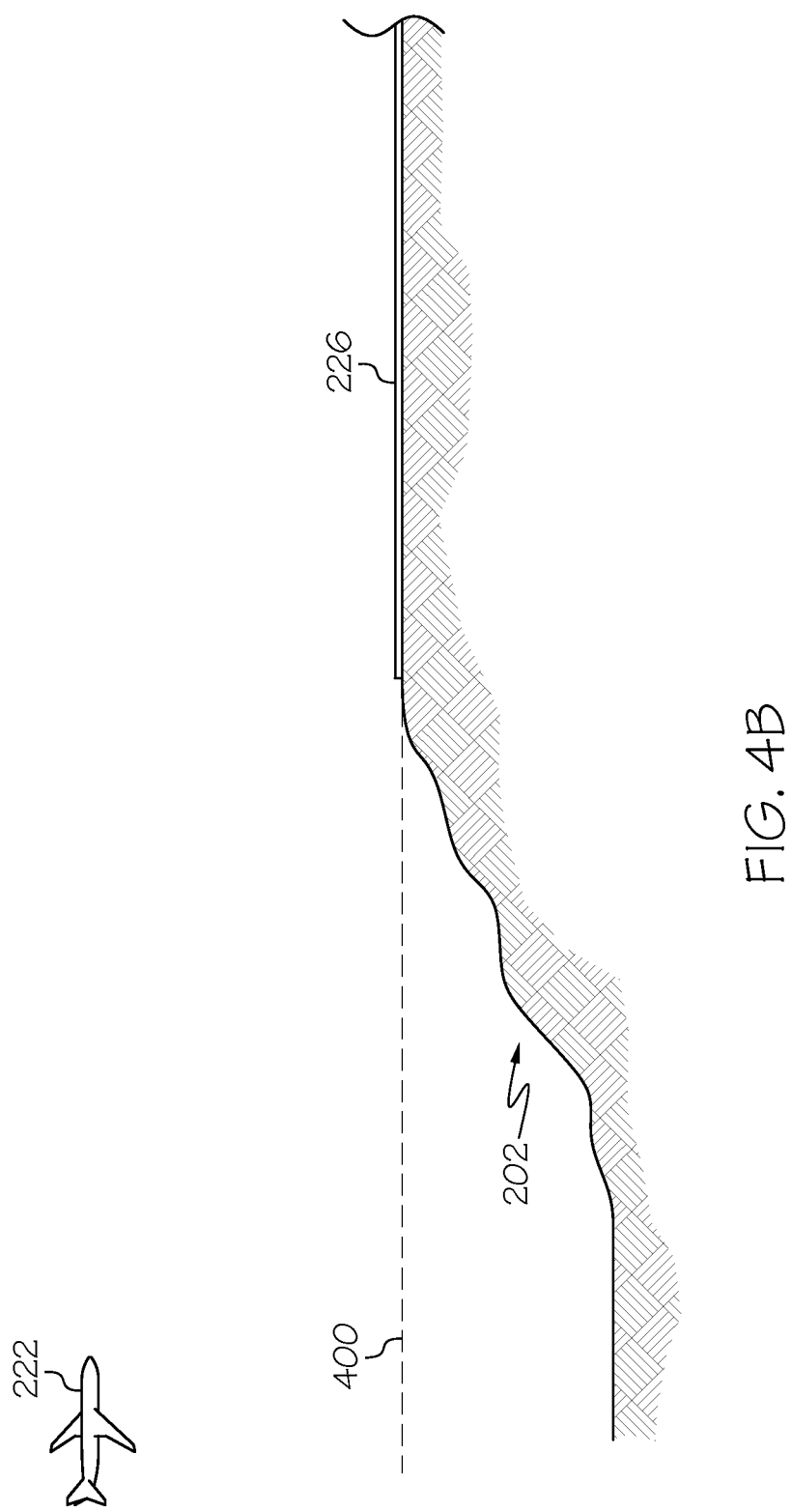

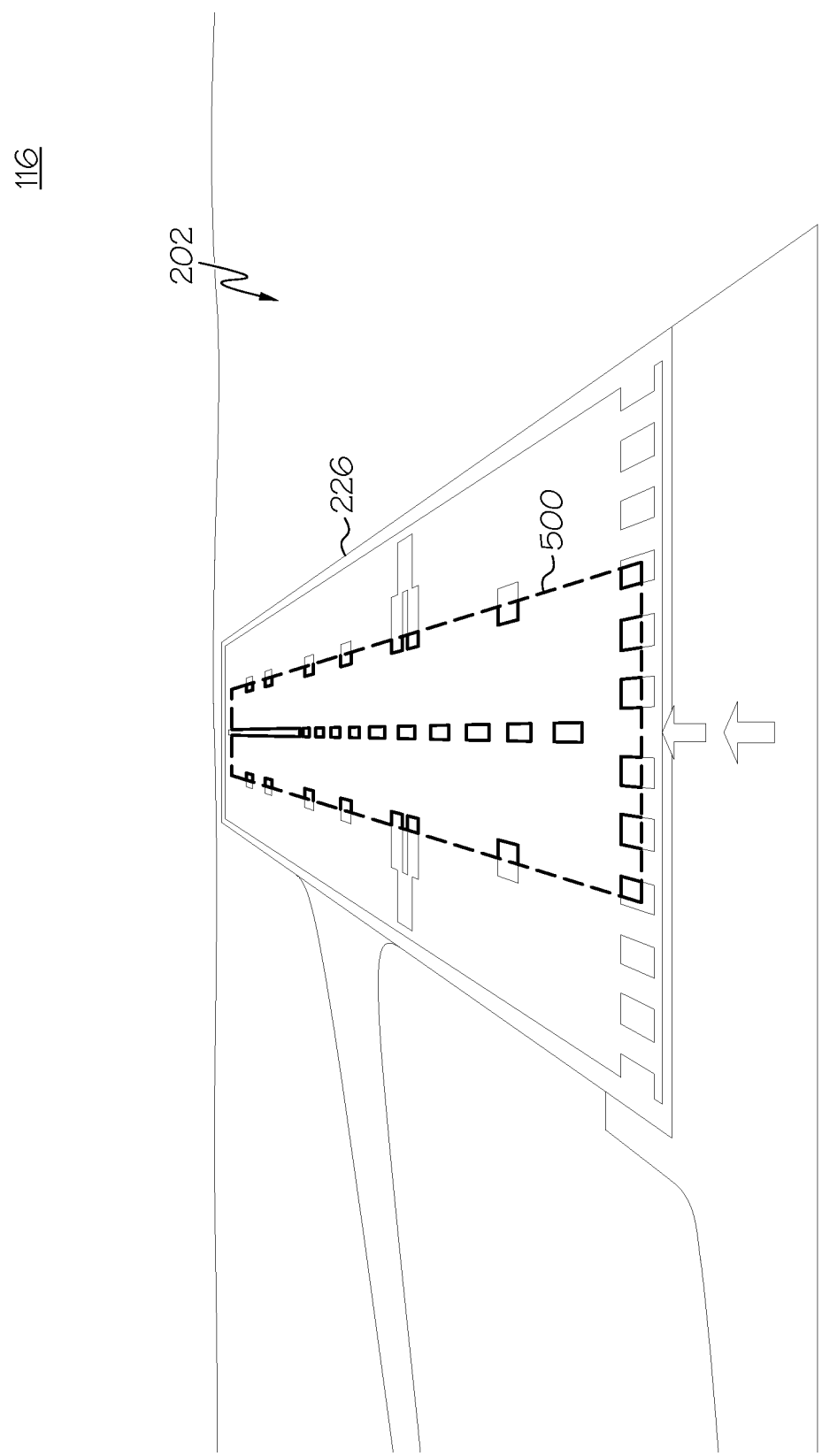

DISPLAY SYSTEMS AND METHODS FOR GENERATING A DISPLAY PROVIDING RUNWAY ILLUSION ALLEVIATION

TECHNICAL FIELD

The present disclosure generally relates to aircraft display systems and methods for generating a display in an aircraft environment. More particularly, the present disclosure relates to display systems and methods for generating a display providing runway illusion alleviation.

BACKGROUND

During the approach of an aircraft to the runway for landing, it is desirable that the flight crew maintain the aircraft at the appropriate angle with respect to their intended point of touchdown on the runway. This line of approach, often referred to as the glide slope or glide path, should be maintained substantially constant within relatively narrow limits and the line should be measured with respect to the same given point of expected touchdown. Any material variance from this line of approach may cause the aircraft to strike an obstruction such as a tree or power line, or may cause touchdown of the aircraft onto the runway at a point either short of the end of the runway or dangerously far down the runway toward the opposite end thereof as a result of an improperly chosen touchdown point. In instrument approach operations, the glide path angles are maintained by instrument guidance such as ground based glide slope signals. In visual approach operations, however, flight crews can use outside visual objects as reference to maintain the proper glide path.

Visual illusions take place when environmental and runway conditions modify a flight crew's perception of the environment and runway relative to the flight crew's expectations in visual operations. Visual illusions affect the flight crew's vertical and horizontal situational awareness, particularly during visual approach to the runway when flying the "base leg" (perpendicular to the runway orientation), when turning from the base leg to the "final approach" (aligned with the runway orientation), and during the final approach. Visual illusions may induce flight crew inputs that cause the aircraft to deviate from the original and intended vertical or lateral flight path, and this may result in a landing short of the runway, a hard landing, or a runway overrun.

Accordingly, it would be desirable to provide systems and methods that provide runway illusion alleviation. Moreover, it would be desirable to provide such system and methods in the context of a flight display easily that is accessible by the flight during the runway approach phase of flight. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

Display systems and methods for generating a display providing runway illusion alleviation are disclosed herein. In an exemplary embodiment, a display system includes a navigation sub-system that determines a position and orientation of the aircraft in a vicinity of an approaching runway, a terrain database that stores terrain data regarding the vicinity of the approaching runway and a runway database that stores runway data regarding the approaching runway, and a processor communicatively coupled with the navigation sub-system and the terrain and runway databases that determines the existence of a runway illusion effect by analyzing the terrain data and the runway data. The system further includes a graphical display sub-system communicatively coupled with the terrain and runway databases and the processor that renders graphical terrain imagery and graphical runway imagery on the flight display in accordance with the terrain data and the runway data and that further renders a graphical runway illusion alleviation object on the flight display.

In another exemplary embodiment, a method for generating a display includes the steps of determining a position and orientation of the aircraft in a vicinity of an approaching runway, retrieving terrain data regarding the vicinity of the approaching runway and retrieving runway data regarding the approaching runway, determining the existence of a runway illusion effect by analyzing the terrain data and the runway data. The method further includes the steps of rendering graphical terrain imagery and rendering graphical runway imagery on the flight display in accordance with the terrain data and the runway data and rendering a graphical runway illusion alleviation object on the flight display.

BRIEF DESCRIPTION OF THE DRAWINGS

The present disclosure will hereinafter be described in conjunction with the following drawing figures, wherein like numerals denote like elements, and wherein:

FIG. 3B is a side profile view provided for greater understanding of the runway illusion alleviation objection and the down-sloping terrain condition of the flight display of FIG. 3A;

FIG. 4B is a side profile view provided for greater understanding of the runway illusion alleviation objection and the up-sloping terrain condition of the flight display of FIG. 4A;

FIG. 5 is an exemplary flight display providing runway illusion alleviation with a runway illusion alleviation object for a runway aspect ratio condition according to an exemplary embodiment;

DETAILED DESCRIPTION

Figure 1:
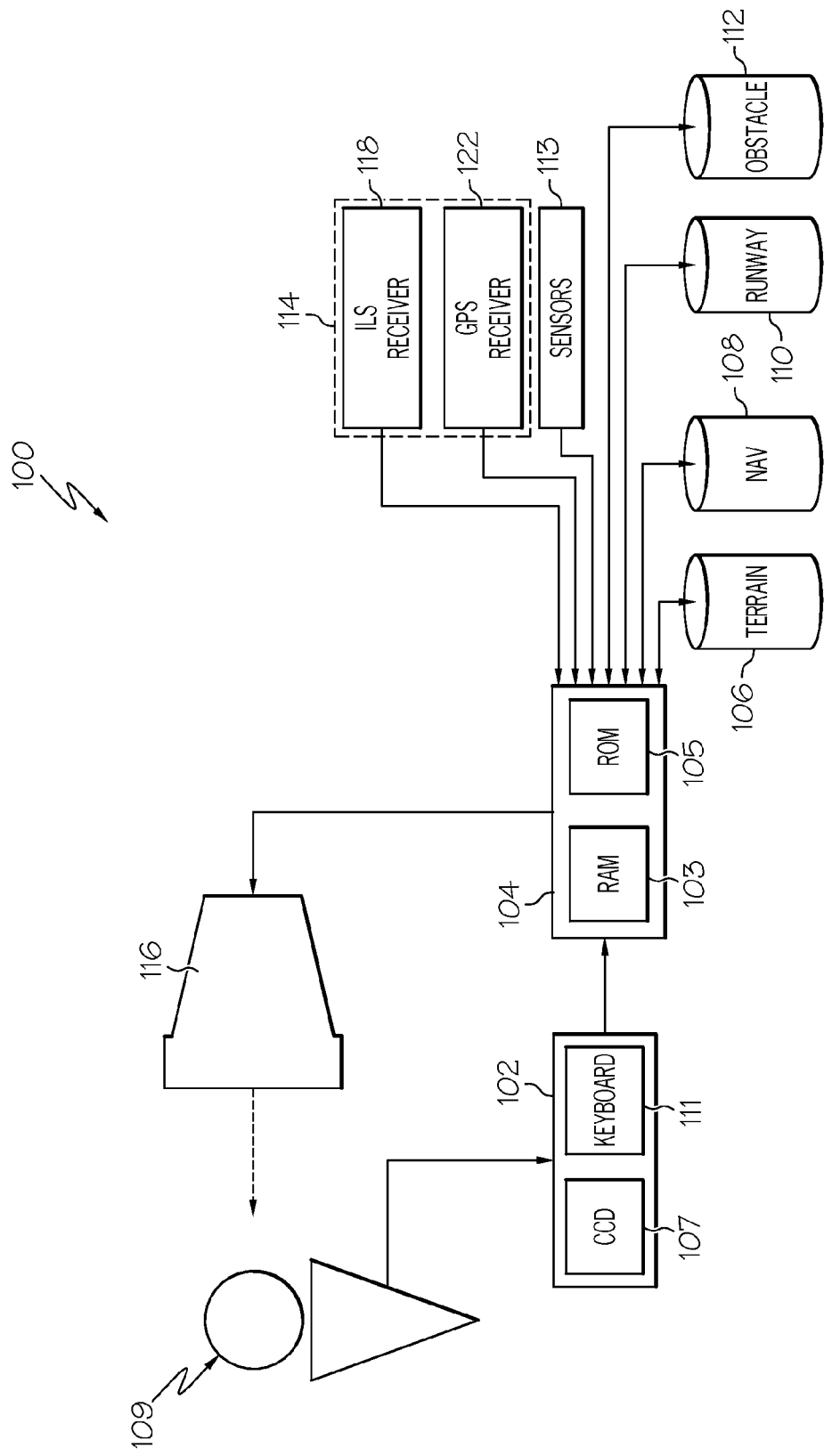
FIG. 1 is a functional block diagram of a flight display system according to an exemplary embodiment.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Runway illusions are widely known to occur during visual approach to a runway under various environmental and runway conditions. One such condition is the presence of uphill or downhill terrain immediately prior to the approach end of the runway. An uphill slope in the approach zone or a drop-off of terrain at the approach end of the runway creates an illusion of being too high on the approach. A downhill slope in the approach zone creates an illusion of being too low on the approach. Another condition is the aspect ratio of the runway, or runway dimensions, being different from what the flight crew is used to seeing. The runway aspect ratio (i.e., its length relative to its width) affects the flight crew's visual perspective view of the runway. A wide or short runway (low aspect ratio) creates an illusion of being too low on the approach. A narrow or long runway (high aspect ratio) creates an illusion of being too high on the approach. Yet another condition is an up-sloping or a down-sloping runway. An uphill slope creates an illusion of being too high on the approach (impression of a steep glide path). A downhill slope creates an illusion of being too low (impression of a shallow glide path). Moreover, where a runway has a mound in a mid-portion of the runway, both illusions may be experienced. Still further, another condition relates to runway lighting at night. Bright runway lights create the illusion of being closer to the runway, whereas low-intensity lights create the illusion of being farther away. A non-standard spacing of runway lights also modifies the flight crew's perception of the runway distance and glide path. If runway lighting is partially visible (e.g., during the "downwind leg" (parallel to the runway orientation) or during the base leg of a visual or circling approach), the runway may appear to be farther away or at a different angle. In some instances, synthetic vision systems (SVS) solve the runway lighting illusion by simply not displaying the lights. Other approaches are also addressed in this disclosure.

The embodiments described herein generally set forth display systems and methods for generating a display that provide runway illusion alleviation with respect to at least the foregoing-described runway illusion conditions. As many aircraft nowadays are equipped with flight deck (or cockpit) display systems, in one embodiment, the runway illusion alleviation is provided through the aircraft's flight deck display. The architecture of an exemplary flight deck display system that is suitable for use with embodiments of the present disclosure is set forth briefly below in connection with FIGS. 1 and 2. With respect to these Figures, techniques and technologies may be described herein in terms of functional and/or block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions.

Referring first to FIG. 1, an exemplary flight deck display system 100 is depicted and will be described herein. The system 100 includes a user interface 102, a processor 104, one or more terrain databases 106, one or more navigation databases 108, one or more runway databases 110, one or more obstacle databases 112), various sensors 113, various external data sources 114, and a display device 116. The user interface 102 is in operable communication with the processor 104 and is configured to receive input from a user 109 (e.g., a pilot or flight crew) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103 and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 113, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, special use airspace, political boundaries, communication frequencies, and aircraft approach information. It will be appreciated that, although the terrain databases 106, the navigation databases 108, the runway databases 110, and the obstacle databases 112 are, for clarity and convenience, shown as being stored separate from the processor 104, all or portions of either or both of these databases 106, 108, 110, 112 could be loaded into the RAM 103, or integrally formed as part of the processor 104, and/or RAM 103, and/or ROM 105. The databases 106, 108, 110, 112 could also be part of a device or system that is physically separate from the system 100.

The sensors 113 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a flight director and a navigation computer, just to name a couple.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites.

Based on these determinations, the GPS receiver 122, using a technique known as trilateration, determines, for example, aircraft position, groundspeed, and ground track angle. These data may be supplied to the processor 104, which may determine aircraft glide slope deviation therefrom in GPS based instrument approaches. In some implementations, an ILS receiver 118 is also incorporated as a general part of the aircraft avionics, but is not directly involved in the embodiments of the disclosure provided herein.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
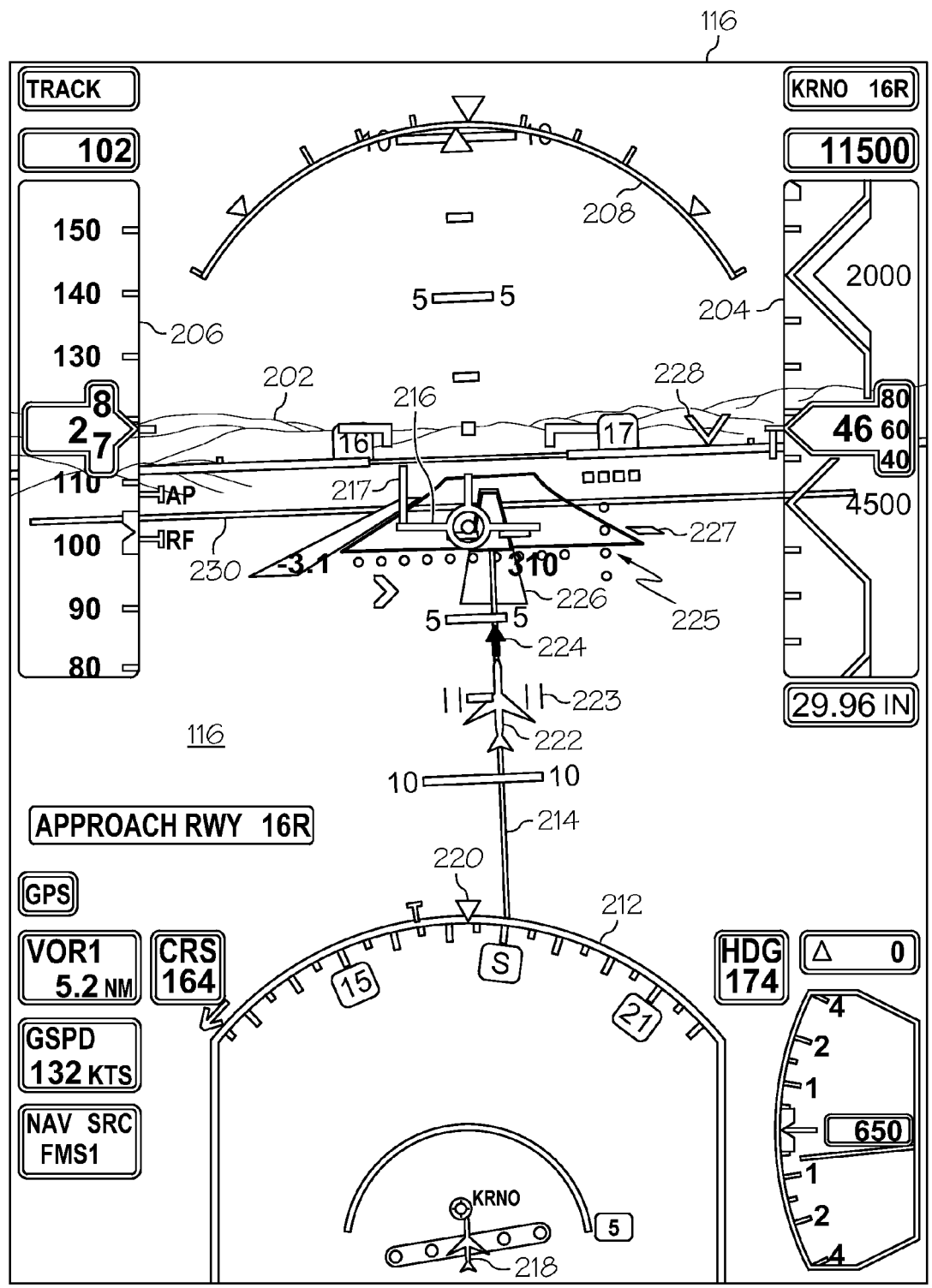
FIG. 2 is an exemplary flight display that may be rendered on the flight display system of FIG. 1.

Referring to FIG. 2, exemplary textual, graphical, and/or iconic information rendered by the display device 116, in response to appropriate display commands from the processor 104 is depicted. It is seen that the display device 116 renders a view of the terrain 202 ahead of the aircraft, preferably as a three-dimensional perspective view, an altitude indicator 204, an airspeed indicator 206, an attitude indicator 208, a compass 212, and an extended runway centerline 214. In some applications, a flight path vector indicator 216 may be provided, but this is an optional feature. The compass 212 includes an aircraft icon 218, and a heading marker 220 identifying the current heading (a heading of 174 degrees is shown). An additional current heading symbol 228 is disposed on the zero pitch reference line 230 to represent the current aircraft heading when the center of the display device 116 is operating in a current track centered mode. The center of the display device 116 represents where the aircraft is moving and the heading symbol 228 on the zero-pitch reference line 230 represent the current heading direction. The compass 212 can be shown either in heading up, or track up mode with airplane symbol 218 representing the present lateral position. It is noted that Flight Path Vector (FPV) information on properly equipped aircraft can provide highly accurate indication of current aircraft trajectories. When used with SVS or HUD, the FPV information will be the primary elements that guide flight crews to the approach target with proper flight path. In the aircraft platforms with less precise flight path information, FPV is either deemphasized or not used, although SVS type displays can be available based on current aircraft position and orientation data. In aircraft platforms without visual displays such as SVS or HUD, FPV information is not directly available to flight crews. Additional information (not shown) is typically provided in either graphic or numerical format representative, for example, of glide slope, altimeter setting, and navigation receiver frequencies.

The desired aircraft direction is determined, for example, by the processor 104 using data from the navigation database 108, the sensors 113, and the external data sources 114. It will be appreciated, however, that the desired aircraft direction may be determined by one or more other systems or subsystems, and from data or signals supplied from any one of numerous other systems or subsystems within, or external to, the aircraft.

In a particular, non-limiting embodiment, the flight deck display system 100 may be provided as a synthetic vision system. As is known in the art, many vehicles, such as aircraft, are commonly equipped with one or more vision enhancing systems to convey flight path and/or flight management information. Such vision enhancing systems are designed and configured to assist a pilot when flying in conditions that diminish the pilot's view from the cockpit, such as, but not limited to, darkness and weather phenomenon. One example of a vision enhancing system is known as a synthetic vision system (hereinafter, "SVS"), which may be more generally described as a being a dynamic condition subsystem of the aircraft. An example of a synthetic vision system is disclosed in U.S. Pat. No. 7,352,292. Additionally, an exemplary synthetic vision system is available for sale under product name SmartView®, manufactured by Honeywell International Inc. of Morristown, N.J., USA. Accordingly, in any embodiment described below, the display 116 provided on display system 100 may be an integrated function of a SVS.

FIGS. 3A, 4A, 5, 6A, 7A, and 8 depict graphical renderings of runway illusion alleviation objects that may be displayed on the display device 116 in accordance with exemplary embodiments of the present disclosure. For ease of illustration and understanding, the graphical renderings of FIGS. 3A, 4A, 5, 6A, 7A, and 8 have been simplified to only include the terrain 202, the runway 226, and the runways illusion alleviation objects (as will be described in greater detail below). It should be appreciated, however, that the display device 116 in each embodiment may also be understood to have rendered thereon some or all of the additional features described above with regard to FIG. 2 (e.g., the altitude indicator 204, the airspeed indicator 206, the attitude indicator 208, the compass 212, the extended runway centerline 214, the flight path vector indicator 216, etc.), although these features will not be separately illustrated in the following Figures.

Figure 3A:
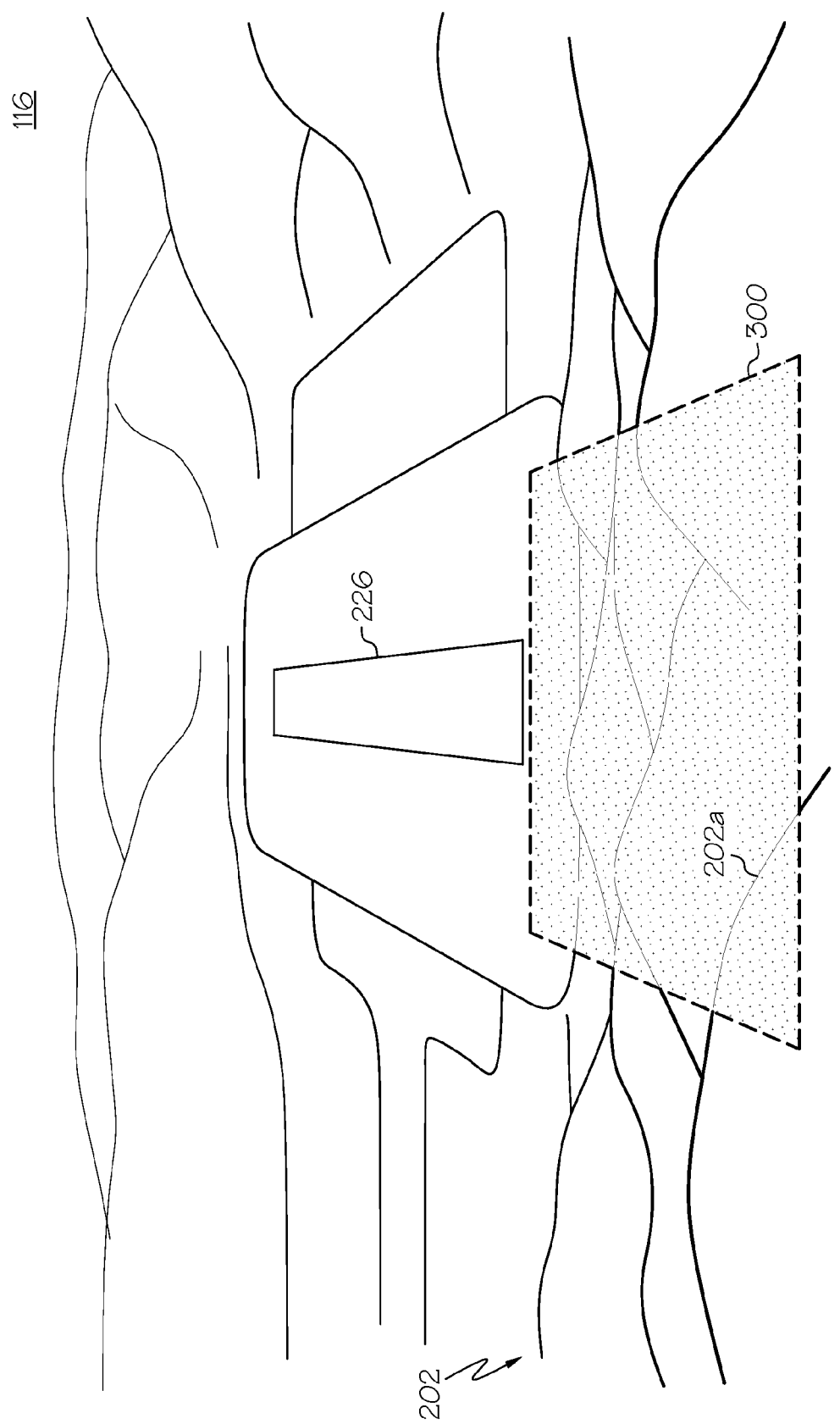
FIG. 3A is an exemplary flight display providing runway illusion alleviation with a runway illusion alleviation object for a down-sloping terrain condition according to an exemplary embodiment.

Turning first to FIG. 3A, this Figure is an exemplary flight display 116 providing runway illusion alleviation with a runway illusion alleviation object 300 for a down-sloping terrain condition according to an exemplary embodiment. As generally depicted in FIG. 3A, the terrain 202 in front of runway 226 is down-sloping, which as noted above, creates an illusion of being too low on the approach. The runway illusion alleviation object 300 is rendered on the display 116 as a quadrilateral object that is coplanar with the runway 226 and extends forward from the runway threshold toward the position of the aircraft. The co-planarity with the runway causes the object 300 to extend "into" the down-sloping terrain 202 in front of the runway threshold. Thus, the display 116 causes the down-sloping terrain 202 over the object 300 to become semi-transparent (as indicated by thinner terrain lines 202a) so that both the terrain 202 and the object 300 are visible at the same time. FIG. 3B is also provided for the reader's improved understanding of FIG. 3A, and depicts an "explanatory" side view of the terrain 202, the runway 226, and illusion alleviation object 300 for purposes of demonstrating the intended perspective of the object 300 in reference to the runway 226 and the terrain 202. It should be noted that FIG. 3B is not actually a display in accordance with the present disclosure and is not displayed to the flight crew at any time, but rather is provided as a part of this disclosure for the reader's improved understanding of the display 116 shown in FIG. 3A. The object 300 alleviates the illusion caused by the down-sloping terrain by providing a reference plane that extends forward of the runway 226 to allow the pilot to see the true orientation of the runway 226, and prevent the terrain 202 from causing an illusion effect. In alternative embodiments, a text or aural alert could be issued to the flight crew indicating the presence and/or type of runway illusion, in addition to or as an alternative to the above described display.

Figure 4A:
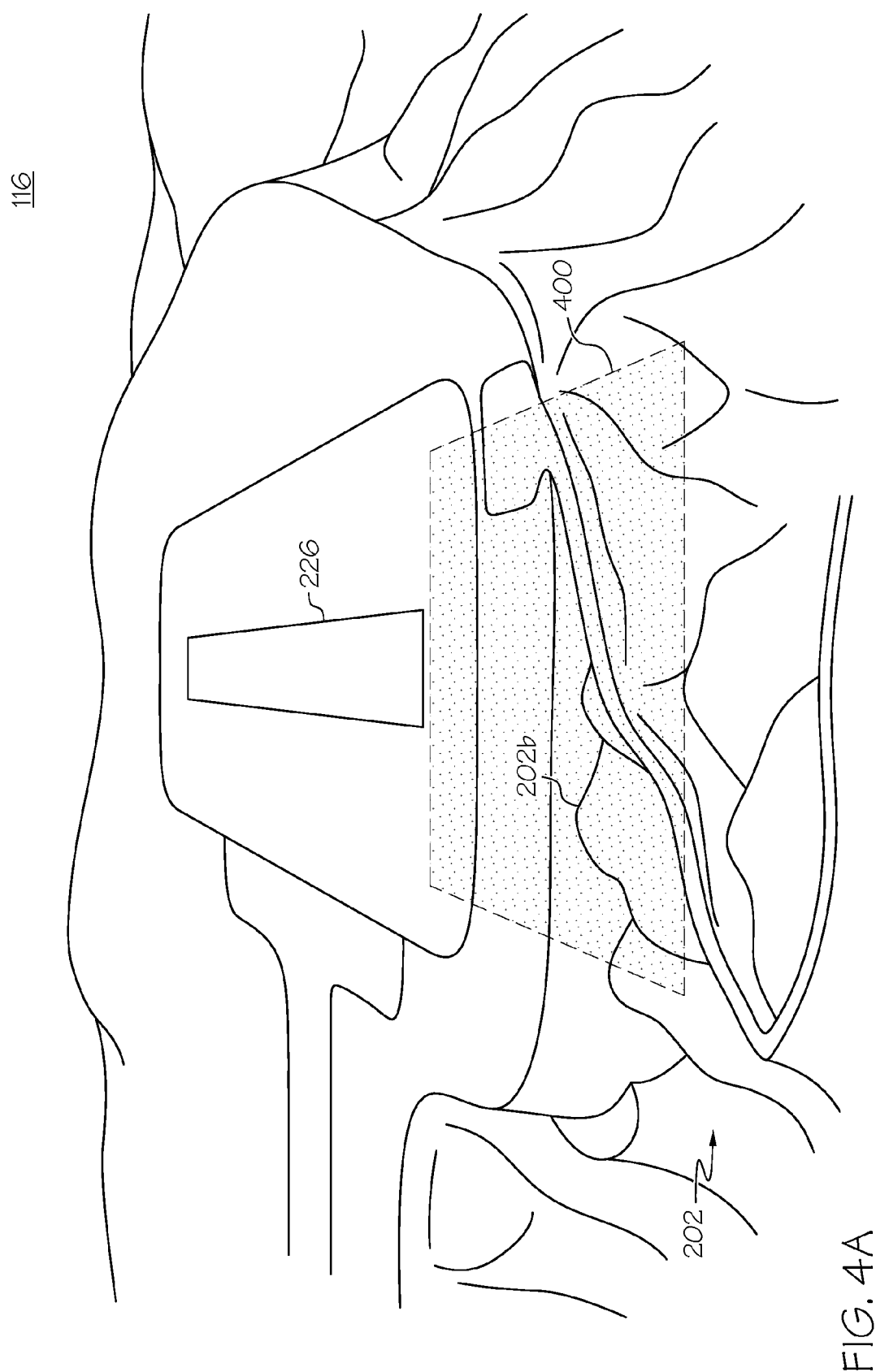
FIG. 4A is an exemplary flight display providing runway illusion alleviation with a runway illusion alleviation object for an up-sloping terrain condition according to an exemplary embodiment.

FIG. 4A is an exemplary flight display 116 providing runway illusion alleviation with a runway illusion alleviation object 400 for an up-sloping terrain condition according to an exemplary embodiment. As generally depicted in FIG. 4A, the terrain 202 in front of runway 226 is up-sloping, which as noted above, creates an illusion of being too high on the approach. The runway illusion alleviation object 400 is rendered on the display 116 as a quadrilateral object that is coplanar with the runway 226 and extends forward from the runway threshold toward the position of the aircraft. The co-planarity with the runway causes the object 300 to extent "over" the up-sloping terrain 202 in front of the runway threshold. Thus, the display 116 causes the object 400 to become semi-transparent (as indicated by terrain lines 202b being visible through the object 400) so that both the terrain 202 and the object 400 are visible at the same time. FIG. 4B is also provided for the reader's improved understanding of FIG. 4A, and depicts an "explanatory" side view of the terrain 202, the runway 226, and illusion alleviation object 400 for purposes of demonstrating the intended perspective of the object 400 in reference to the runway 226 and the terrain 202. The object 400 alleviates the illusion caused by the up-sloping terrain by providing a reference plane that extends forward of the runway 226 to allow the pilot to see the true orientation of the runway 226, and prevent the terrain 202 from causing an illusion effect. In alternative embodiments, a text or aural alert could be issued to the flight crew indicating the presence and/or type of runway illusion, in addition to or as an alternative to the above described display.

FIG. 5 is an exemplary flight display 116 providing runway illusion alleviation with a runway illusion alleviation object 500 for a runway aspect ratio condition according to an exemplary embodiment. As used herein, the term "runway aspect ratio condition" refers to a runway aspect ratio that is different than what the flight crew is accustomed to. For example, as initially noted above, the runway aspect ratio (i.e., its length relative to its width) affects the flight crew's visual perspective view of the runway. A wide or short runway (low aspect ratio) creates an illusion of being too low on the approach. A narrow or long runway (high aspect ratio) creates an illusion of being too high on the approach. Again, these aspect ratios are discussed in the context of what the flight crew is used to. Accordingly, in some embodiments, a "reference runway" is pre-programmed into the system 100 and is used as a reference for determining when the approaching runway has an aspect ratio that differs from the reference runway. This pre-programming may occur automatically by the system 100 detecting which runway is most often visited by the aircraft (i.e., a "home" runway) or it may be programmed manually by the flight crew. As generally depicted in FIG. 5, the runway 226 is relatively wide, which as noted above, creates an illusion of being too low on the approach. The runway illusion alleviation object 500 is rendered on the display 116 as a quadrilateral object that is co-planar with the runway 226, has the substantially same aspect ratio as the pre-determined reference runway, and is overlaid and centered on the runway 226 as a semitransparent object or as an outline such that both the approaching runway 226 and the reference runway object 500 are visible at the same time. The object 500 alleviates the illusion caused by the aspect ratio of the approaching runway 226 by providing object 500 as a reference runway to allow the pilot to see portions of runway 226 represented in an aspect ratio that the flight crew is more accustomed to, and thus prevent the differing runway aspect ratio from causing an illusion effect. In alternative embodiments, a text or aural alert could be issued to the flight crew indicating the presence and/or type of runway illusion, in addition to or as an alternative to the above described display.

Figure 6A:
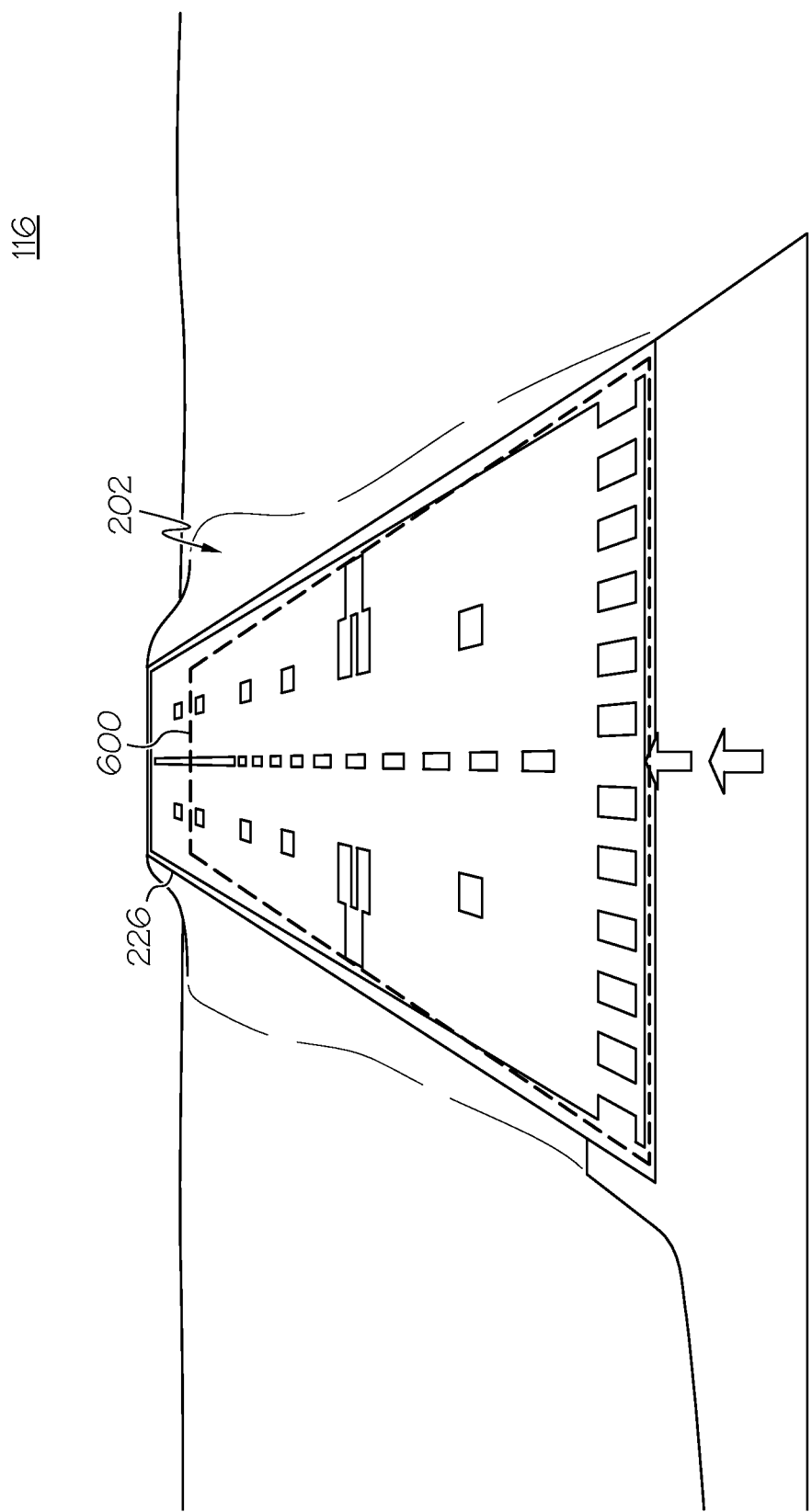
FIG. 6A is an exemplary flight display providing runway illusion alleviation with a runway illusion alleviation object for an up-sloping runway condition according to an exemplary embodiment.
Figure 6B:
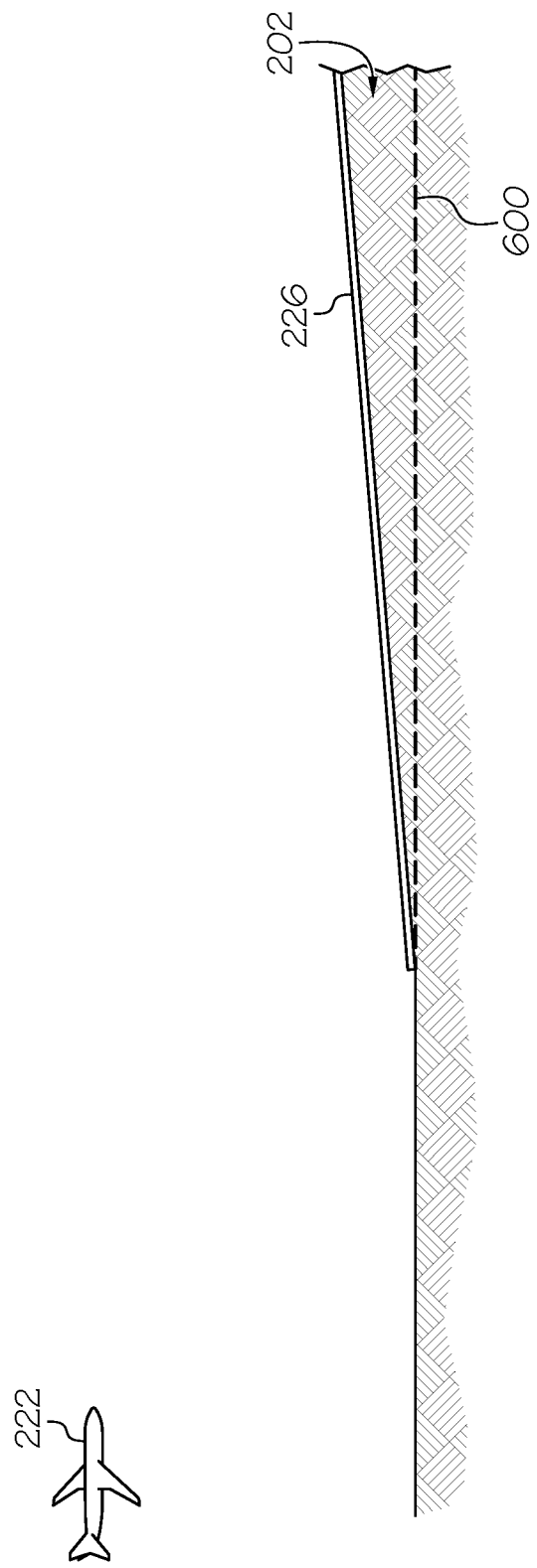
FIG. 6B is a side profile view provided for greater understanding of the runway illusion alleviation objection and the up-sloping runway condition of the flight display of FIG. 6A.

FIG. 6A is an exemplary flight display 116 providing runway illusion alleviation with a runway illusion alleviation object 600 for an up-sloping runway condition according to an exemplary embodiment. As generally depicted in FIG. 6A, the terrain 202 underlying runway 226 is up-sloping, which as noted above, creates an illusion of being too high on the approach. The runway illusion alleviation object 600 is rendered on the display 116 as a quadrilateral object representing a "reference runway" of the same size and shape as the approaching runway 226, but being level-sloped as opposed to up-sloping. As shown in FIG. 6A, this gives the appearance on the display that the reference runway object 600 is increasing in depth underneath the approaching runway 226 from the runway threshold to the runway departure point. The object 600 may be provided as semitransparent or it may be provided in outline form, such that both the approaching runway 226 and the reference runway object 600 are visible at the same time. FIG. 6B is also provided for the reader's improved understanding of FIG. 6A, and depicts an "explanatory" side view of the terrain 202, the runway 226, and illusion alleviation object 600 for purposes of demonstrating the intended perspective of the object 600 in reference to the runway 226 and the terrain 202. The object 600 alleviates the illusion caused by the up-sloping runway by providing a reference runway object 600 that is provided at the same location as the approaching runway 226 but on a level plane (as opposed to up-sloping) to allow the pilot to see the orientation of the runway 226 if it were level, and prevent the up-sloping terrain 202 underneath the runway 226 from causing an illusion effect. In alternative embodiments, a text or aural alert could be issued to the flight crew indicating the presence and/or type of runway illusion, in addition to or as an alternative to the above described display.

Figure 7A:
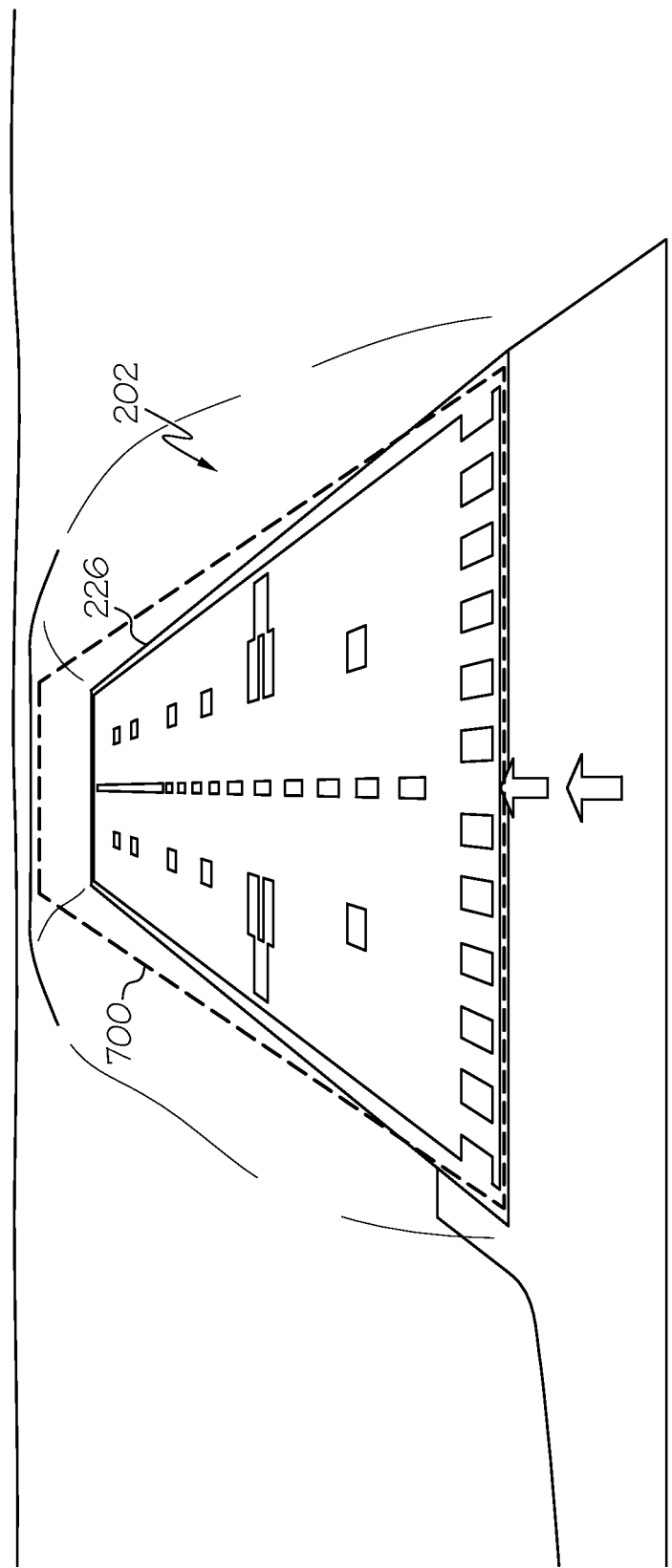
FIG. 7A is an exemplary flight display providing runway illusion alleviation with a runway illusion alleviation object for a down-sloping runway condition according to an exemplary embodiment.
Figure 7B:
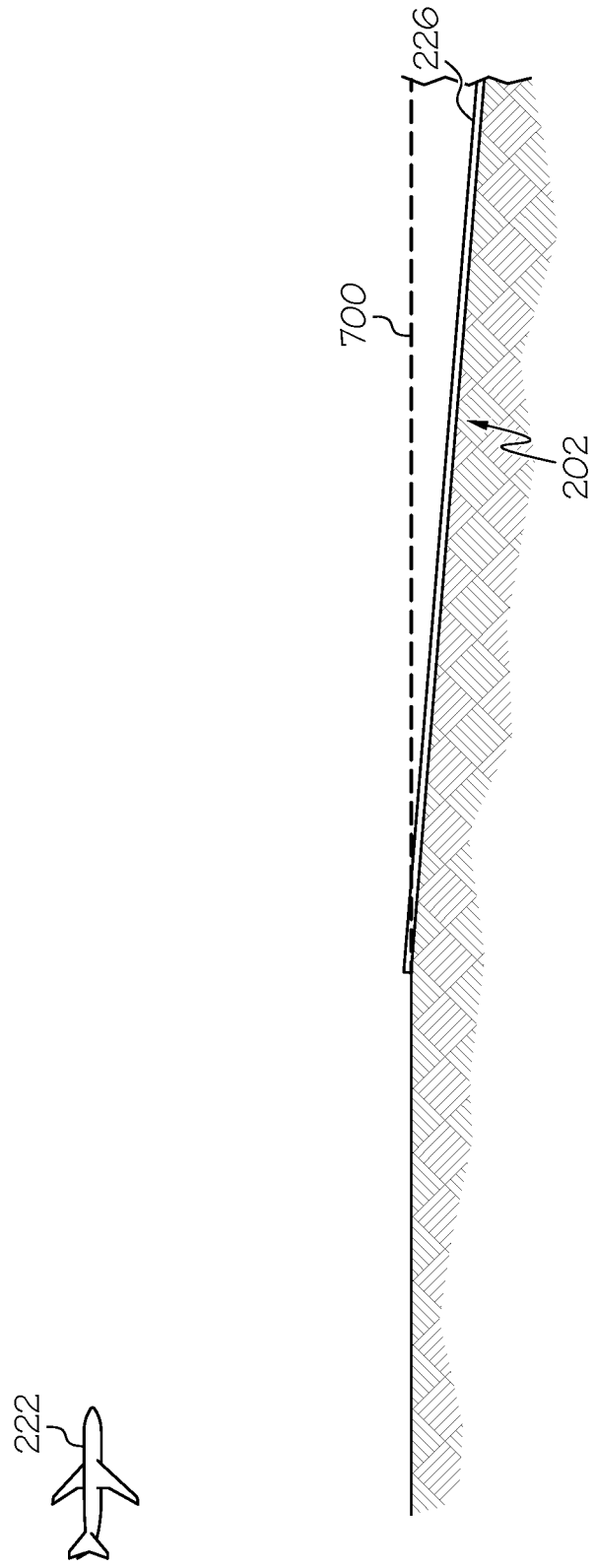
FIG. 7B is a side profile view provided for greater understanding of the runway illusion alleviation objection and the down-sloping runway condition of the flight display of FIG. 7A.

FIG. 7A is an exemplary flight display 116 providing runway illusion alleviation with a runway illusion alleviation object 700 for an down-sloping runway condition according to an exemplary embodiment. As generally depicted in FIG. 7A, the terrain 202 underlying runway 226 is down-sloping, which as noted above, creates an illusion of being too low on the approach. The runway illusion alleviation object 700 is rendered on the display 116 as a quadrilateral object representing a "reference runway" of the same size and shape as the approaching runway 226, but being level-sloped as opposed to down-sloping. As shown in FIG. 7A, this gives the appearance on the display that the reference runway object 700 is increasing in height over the approaching runway 226 from the runway threshold to the runway departure point. The object 700 may be provided as semitransparent or it may be provided in outline form, such that both the approaching runway 226 and the reference runway object 700 are visible at the same time. FIG. 7B is also provided for the reader's improved understanding of FIG. 7A, and depicts an "explanatory" side view of the terrain 202, the runway 226, and illusion alleviation object 700 for purposes of demonstrating the intended perspective of the object 700 in reference to the runway 226 and the terrain 202. The object 700 alleviates the illusion caused by the down-sloping runway by providing a reference runway object 700 that is provided at the same location as the approaching runway 226 but on a level plane (as opposed to down-sloping) to allow the pilot to see the orientation of the runway 226 if it were level, and prevent the down-sloping terrain 202 underneath the runway 226 from causing an illusion effect. In alternative embodiments, a text or aural alert could be issued to the flight crew indicating the presence and/or type of runway illusion, in addition to or as an alternative to the above described display.

For a runway with a mound at a mid-portion thereof, some combination of the displays of FIGS. 6A and 7A would be required. Namely, approaching the mound from the runway threshold, an up-sloping runway condition would be present, and the runway illusion alleviation object 600 would be required to be overlaid at that portion of the display 116. Proceeding from the mound toward the runway departure point, a down-sloping runway condition would be present, and the runway illusion alleviation object 700 would be required to be overlaid at that portion of the display 116.

Figure 8:
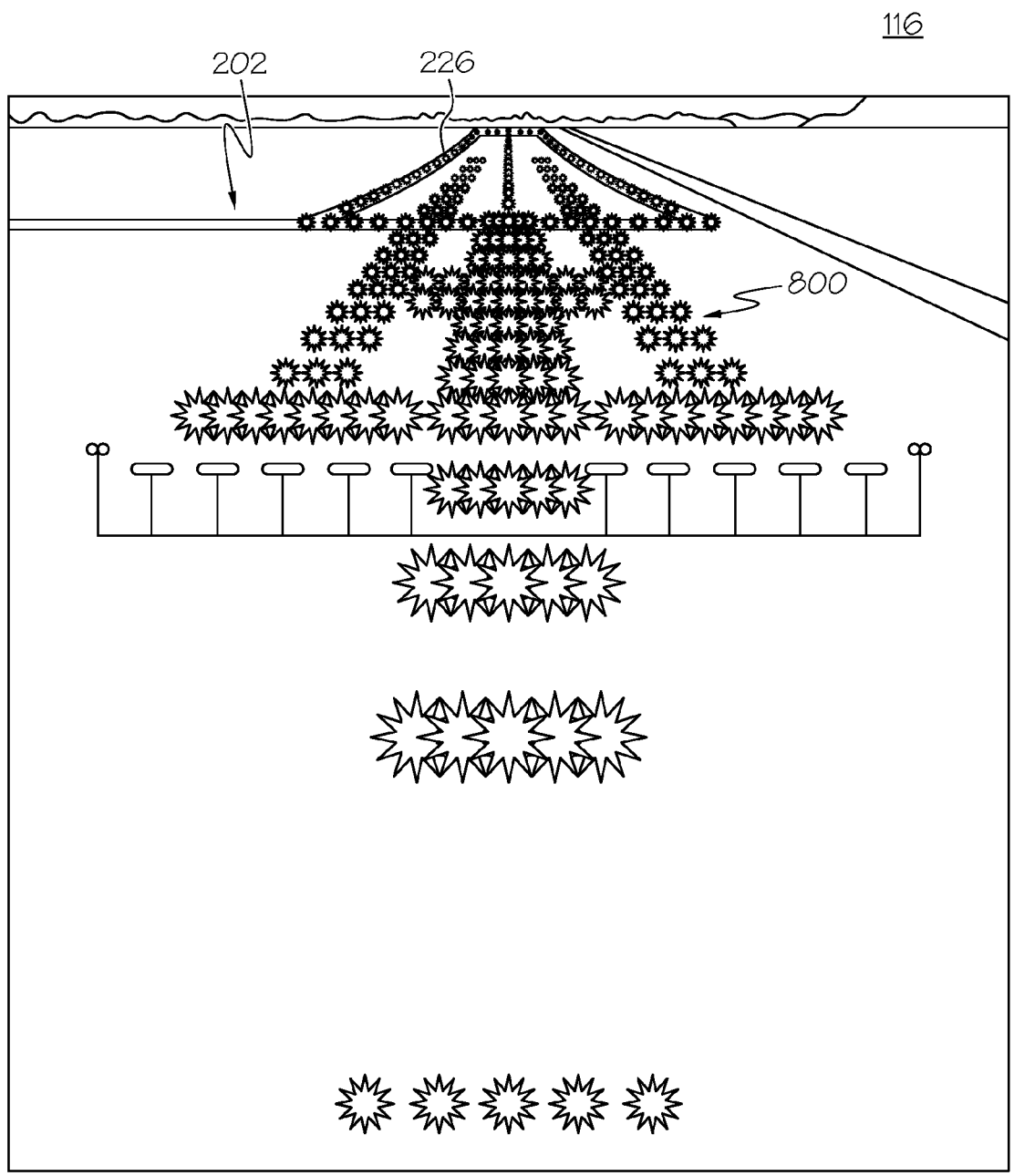
FIG. 8 is an exemplary flight display providing runway illusion alleviation with a runway illusion alleviation object for a runway lighting condition according to an exemplary embodiment.

Turning now to FIG. 8, disclosed is an exemplary flight display providing runway illusion alleviation with a runway illusion alleviation object for a runway lighting condition (including both approach lights and runway edge lights) according to an exemplary embodiment. As initially noted above, bright runway lights create the illusion of being closer to the runway, whereas low-intensity lights create the illusion of being farther away. A non-standard spacing of runway lights also modifies the flight crew's perception of the runway distance and glide path. If runway lighting is partially visible (e.g., during the downwind leg or during the base leg of a visual or circling approach), the runway may appear to be farther away or at a different angle. As initially noted above, in some instances, the SVS can alleviate this problem by not displaying the lighting. In other implementations, the illusion alleviation object 800 displayed on the display 116 in FIG. 8 includes a plurality of runway lights that are spaced apart in accordance with standard spacing and are oriented according to standard orientations. The terms "standard spacing" and "standard orientation" are used herein with respect to the guidelines promulgated by the various regulatory agencies that have jurisdiction over airport and air traffic affairs, and thus may vary from airport to airport. In one example, in the United States, standard runway light spacing and configurations are determined in accordance with the Federal Aviation Administration (FAA) Aeronautical Information Manual (AIM), chapter 2, "Aeronautical Lighting and Other Airport Visual Aids." Other regulations for other jurisdictions will be known by those having ordinary skill in the art. The runway illusion alleviation object 800 is rendered on the display 116 as a plurality of lights that are spaced and configured subtantially in accordance with the standards of the jurisdiction controlling the approaching runway 226. The object 800 alleviates the illusion caused by possible non-standard light by providing a display 116 of lighting in front of (approach lighting) and around (edge lighting) the runway 226 at a standard spacing and in a standard configuration. In alternative embodiments, a text or aural alert could be issued to the flight crew indicating the presence and/or type of runway illusion, in addition to or as an alternative to the above described display.

Figure 9:
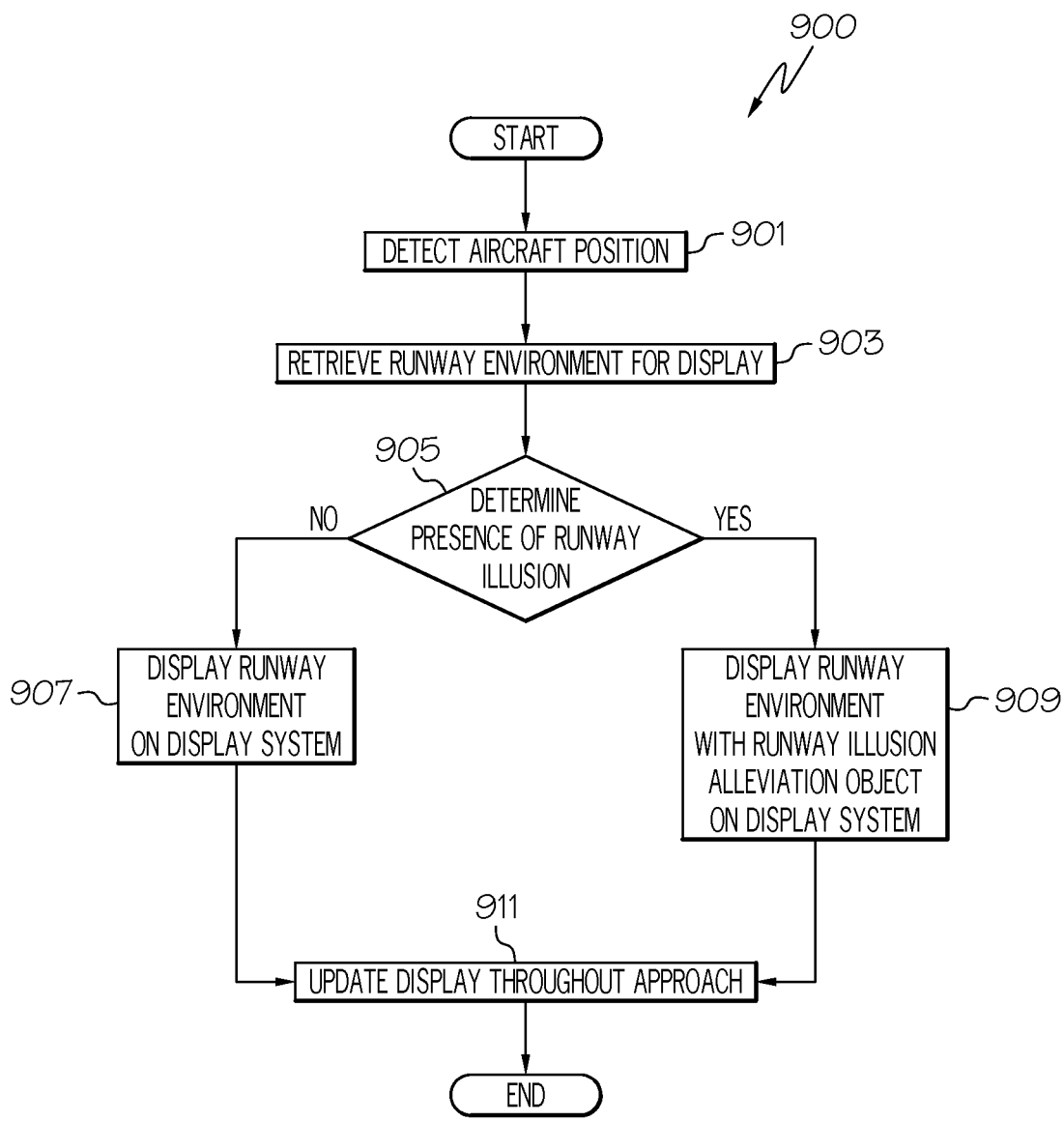
FIG. 9 is a block diagram of a method for generating a flight display providing runway illusion alleviation according to any of the embodiments depicted in connection with FIG. 3A, 4A, 5, 6A, 7A, or 8.

FIG. 9 is a block diagram of a method for generating a flight display providing runway illusion alleviation in accordance with any of the displays 116 presented in FIG. 3A, 4A, 5, 6A, 7A, or 8, above. The method 900 begins with a step 901 of detecting the position of the aircraft. This may be accomplished using system 100, described above, and in particular the sensors 113, GPS 122, and navigation database 108 thereof. In accordance with an embodiment, the runway illusion alleviation functions of the present disclosure are initiated when the aircraft position is detected to be within the visual range of an airport, namely, at a position where the display 116 renders a runway image 226 as determined by the terrain, navigation, and runway databases 106, 108, 110.

In this context, the method 900 continues with step 903, which includes retrieving the runway environment for display on the display device 116. Again, the runway environment, as rendered on the display device 116, is determined by accessing data from the terrain, navigation, and runway databases 106, 108, 110, passing such data through the processor 104 to the display 116, as described above in connection with FIGS. 1 and 2.

The method 900 continues with step 905, which includes determining the presence of a runway illusion. In some embodiments, this determination is made using a predetermined threshold. For example, it will be appreciated that no runway in the world is perfectly level, or has perfectly level terrain in its surrounding environs. Accordingly, if no threshold were established, the illusion alleviation objects would be displayed during every approach, even where the conditions causing the illusion were so slight as to be completely imperceptible by the flight crew. Thus, for runway/terrain sloping conditions, a threshold of a minimum/maximum slope may be pre-determined and programmed into the system 100 such that the alleviation objects are only display in the event that a runway or its environment would cause an appreciable illusion effect. These thresholds may be pre-set in the memory 103/105 of the system 100, and/or they may be changeable by the flight crew based on flight crew preferences. By way of an illustrative example, a threshold may be a runway up-slope/down-slope of greater than +/−1 degree. Another threshold may be terrain that ascends/descend greater than +/−100 feet within a half-mile distance from the runway threshold. Yet another threshold may be a runway aspect ratio that differs greater than +/−10% from the reference runway aspect ratio. Yet another threshold may be a runway lighting spacing/configuration that differs greater than +/−10% from the standard lighting spacing/configuration. Of course, these thresholds are merely examples used for purposes of illustration, and the skilled artisan will appreciate many other thresholds that may be suitable for use in accordance with the exemplary embodiments presented herein.

In the event that no illusion effect is determined to be present in connection with the approaching runway, at step 907, the display 116 is provided as usual, namely, the runway and surrounding environs without the display of any alleviation object. In contrast, where a runway illusion is detected, i.e., the condition exceeds the pre-determined threshold, at step 909, the display 116 is provided including the runway and surrounding environs as well as including the appropriate runway illusion alleviation object, for example as shown in connections with FIG. 3A, 4A, 5, 6A, 7A, or 8 and as modified in practice with the additional features of the display 116 in FIG. 2. The display 116 is continuously updated, including the runway position, terrain position, and illusion alleviation object (if applicable) as the approach continues, i.e. as the aircraft continues with its approach to the runway, as shown in step 911 of method 900. In other embodiments, the method includes the step of generating a text or aural alert to the flight crew indicating the presence and/or type of visual illusion, if one is detected, which may be in addition to or an alternative to providing the display.

Accordingly, the foregoing disclosure has set forth various embodiments of display systems and methods for generating a display providing runway illusion alleviation. The systems and methods provide a runway illusion alleviation object on the flight display, such as a PFD or SVS, which allows the flight crew to recognize the presence of an illusion effect and remain cognizant of the true runway condition, thereby alleviating any effect that the runway illusion may have present to the flight crew.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for generating a flight display on an aircraft comprising the steps of:
   determining a position and orientation of the aircraft in a vicinity of an approaching runway;
   retrieving terrain data regarding the vicinity of the approaching runway and retrieving runway data regarding the approaching runway;
   determining the existence of a runway illusion effect by analyzing the terrain data and the runway data;
   rendering graphical terrain imagery and rendering graphical runway imagery on the flight display in accordance with the terrain data and the runway data; and
   rendering a graphical runway illusion alleviation object on the flight display,
   wherein determining the existence of the runway illusion effect comprises analyzing the terrain data and the runway data for the existence of a terrain slope, a runway slope, a runway aspect ratio or width, or a runway lighting spacing that exceed a pre-determined threshold value, and
   wherein determining the existence of the runway illusion effect comprises one or more of the follow steps (a), (b), (c), or (d):
   (a) determining that the terrain slope exceeds the pre-determined threshold value and wherein rendering the graphical runway illusion alleviation object comprises rendering a quadrilateral reference plane that is co-planar with the graphical runway imagery and extends forward and away from the graphical runway imagery from a runway threshold thereof,
   (b) determining that the runway slope exceeds the pre-determined threshold value and wherein rendering the graphical runway illusion alleviation object comprises rendering a quadrilateral reference runway that is level-sloped and extends along the graphical runway imagery from a threshold end thereof to a departure end thereof,
   (c) determining that the runway aspect ratio or width differs from a reference runway aspect ratio by at least the pre-determined threshold value and wherein rendering the graphical runway illusion alleviation object comprises rendering a quadrilateral reference runway that is centered along and co-planar with the graphical runway imagery and that has a runway aspect ratio that is substantially the same as the reference runway aspect ratio, or
   (d) determining that the runway lighting spacing differs from a standard runway lighting spacing by at least the pre-determined threshold value and wherein rendering the graphical runway illusion alleviation object comprises rendering runway lighting in the vicinity of the approaching runway that substantially conforms to the standard runway lighting spacing.

2. The method of claim 1, wherein determining the existence of the runway illusion effect pursuant to step (a) comprises determining the presence of down-sloping terrain in front of the runway threshold that exceeds a pre-determined threshold for down-sloping terrain and wherein rendering the graphical terrain imagery comprises rendering semi-transparent terrain imagery in an area of the graphical terrain imagery that overlies the quadrilateral reference plane so as to simultaneously display the graphical terrain imagery and the quadrilateral reference plane.

3. The method of claim 1, wherein determining the existence of the runway illusion effect pursuant to step (a) comprises determining the presence of up-sloping terrain in front of the runway threshold that exceeds a pre-determined threshold for up-sloping terrain and wherein rendering the graphical terrain imagery comprises rendering the quadrilateral reference plane in a semi-transparent manner so as to simultaneously display the graphical terrain imagery and the quadrilateral reference plane.

4. The method of claim 1, wherein determining the existence of the runway illusion effect pursuant to step (b) comprises determining the presence of a down-sloping runway that exceeds a pre-determined threshold for down-sloping runways and wherein rendering the level-sloped quadrilateral reference runway comprises rendering a semi-transparent or outline reference runway that extends a greater distance above the graphical runway imagery with increasing length along the graphical runway imagery from the threshold end to the departure end.

5. The method of claim 1, wherein determining the existence of the runway illusion effect pursuant to step (b) comprises determining the presence of an up-sloping runway that exceeds a pre-determined threshold for up-sloping runways and wherein rendering the level-sloped quadrilateral reference runway comprises rendering a semi-transparent or outline reference runway that extends a greater distance below the graphical runway imagery with increasing length along the graphical runway imagery from the threshold end to the departure end.

6. A flight display system on an aircraft comprising:
a navigation sub-system that determines a position of the aircraft in a vicinity of an approaching runway;
a terrain database that stores terrain data regarding the vicinity of the approaching runway and a runway database that stores runway data regarding the approaching runway;
a processor communicatively coupled with the navigation sub-system and the terrain and runway databases that determines the existence of a runway illusion effect by analyzing the terrain data and the runway data; and
a graphical display sub-system communicatively coupled with the terrain and runway databases and the processor that renders graphical terrain imagery and graphical runway imagery on the flight display in accordance with the terrain data and the runway data and that further renders a graphical runway illusion alleviation object on the flight display,
wherein the processor analyzes the terrain data and the runway data for the existence of a terrain slope, a runway slope, a runway aspect ratio, or a runway lighting spacing that exceed a pre-determined threshold value, and
wherein the processor makes one or more of the following determinations (a), (b), (c), or (d):

(a) wherein the processor determines that the terrain slope exceeds the pre-determined threshold value and wherein the graphical display sub-system renders the graphical runway illusion alleviation object as a quadrilateral reference plane that is co-planar with the graphical runway imagery and extends forward and away from the graphical runway imagery from a runway threshold thereof, (b) wherein the processor determines that the runway slope exceeds the pre-determined threshold value and wherein the graphical display sub-system renders the graphical runway illusion alleviation object as a quadrilateral reference runway that is level-sloped and extends along the graphical runway imagery from a threshold end thereof to a departure end thereof, (c) wherein the processor determines that the runway aspect ratio differs from a reference runway aspect ratio or width by at least the pre-determined threshold value and wherein the graphical display subsystem renders the graphical runway illusion alleviation object as a quadrilateral reference runway that is centered along and co-planar with the graphical runway imagery and that has a runway aspect ratio that is substantially the same as the reference runway aspect ratio, or (d) wherein the processor determines that the runway lighting spacing differs from a standard runway lighting spacing by at least the pre-determined threshold value and wherein the graphical display subsystem render the graphical runway illusion alleviation object as runway lighting in the vicinity of the approaching runway that substantially conforms to the standard runway lighting spacing.

7. The system of claim 6, wherein the processor makes determination (a) and wherein the processor further determines the presence of down-sloping terrain in front of the runway threshold that exceeds a pre-determined threshold for down-sloping terrain and wherein the graphical display sub-systems renders the graphical terrain imagery as semi-transparent terrain imagery in an area of the graphical terrain imagery that overlies the quadrilateral reference plane so as to simultaneously display the graphical terrain imagery and the quadrilateral reference plane.

8. The system of claim 6, wherein the processor makes determination (a) and wherein the processor further determines the presence of up-sloping terrain in front of the runway threshold that exceeds a pre-determined threshold for up-sloping terrain and wherein the graphical display sub-system renders the graphical terrain imagery as the quadrilateral reference plane in a semi-transparent manner so as to simultaneously display the graphical terrain imagery and the quadrilateral reference plane.

9. The system of claim 6, wherein the processor makes determination (b) and wherein the processor further determines the presence of a down-sloping runway that exceeds a pre-determined threshold for down-sloping runways and wherein the graphical display sub-system renders the level-sloped quadrilateral reference runway as a semi-transparent or outline reference runway that extends a greater distance above the graphical runway imagery with increasing length along the graphical runway imagery from the threshold end to the departure end.

10. The system of claim 6, wherein the processor makes determination (b) and wherein the processor further determines the presence of an up-sloping runway that exceeds a pre-determined threshold for up-sloping runways and wherein the graphical display sub-system renders the level-sloped quadrilateral reference runway as a semi-transparent or outline reference runway that extends a greater distance below the graphical runway imagery with increasing length along the graphical runway imagery from the threshold end to the departure end.

* * * * *

UNITED STATES PATENT AND TRADEMARK OFFICE
CERTIFICATE OF CORRECTION

PATENT NO. : 9,434,480 B2
APPLICATION NO. : 14/595641
DATED : September 6, 2016
INVENTOR(S) : Wang et al.

It is certified that error appears in the above-identified patent and that said Letters Patent is hereby corrected as shown below:

Claims
Column 12, Line 39, claim 1, "the follow steps" should be changed to --the following steps--

Signed and Sealed this
Eighth Day of November, 2016

Michelle K. Lee
*Director of the United States Patent and Trademark Office*